US006140940A

United States Patent [19]

Klöfer et al.

[11] Patent Number: 6,140,940

[45] Date of Patent: Oct. 31, 2000

[54] ASSEMBLY FOR SIGNAL TRANSFER BETWEEN A TRANSMITTER LOCATION AND A RECEIVER LOCATION

[75] Inventors: Peter Klöfer, Steinen; Jürgen Krüger, Lörrach, both of Germany

[73] Assignee: Endress D+ Hauser GmbH + Co., Maulburg, Germany

[21] Appl. No.: 09/089,688

[22] Filed: Jun. 3, 1998

[30] Foreign Application Priority Data

Jun. 5, 1997 [DE] Germany ........................ 197 23 645

[51] Int. Cl.[7] ........................ H04M 11/04

[52] U.S. Cl. ........................ 340/870.39; 340/870.19; 340/310.01; 340/310.02; 340/310.06

[58] Field of Search ........................ 340/870.39, 870.3, 340/870.19, 870.16, 825.54, 825.06, 310.02, 310, 310.06

[56] References Cited

U.S. PATENT DOCUMENTS

| | | | |
|---|---|---|---|
| 3,783,387 | 1/1974 | Wernli | 340/870.39 |
| 4,520,488 | 5/1985 | Houvig | 340/870.39 |
| 4,806,905 | 2/1989 | McGowan | 340/870.39 |
| 5,014,050 | 5/1991 | Lewiner et al. | 340/870.19 |
| 5,742,225 | 4/1998 | Wetzel | 340/310.02 |

FOREIGN PATENT DOCUMENTS

| | | |
|---|---|---|
| 39 34 007 C2 | 10/1990 | Germany . |
| 44 12 388 A1 | 12/1995 | Germany . |
| 56-140495 | 11/1981 | Japan . |
| 2 229 897 | 10/1990 | United Kingdom . |
| WO 94/20940 | 9/1994 | WIPO . |

*Primary Examiner*—Michael Horabik
*Assistant Examiner*—Albert K. Wong
*Attorney, Agent, or Firm*—Bose McKiney & Evans LLP

[57] ABSTRACT

In an assembly for signal transmission between a transmitter location and a receiver location connected to each other by a two-wire conductor an analog signal current, variable between two limit values, flows via this two-wire conductor. This signal current represents a measured variable sensed by a sensor in the transmitter location and forms the supply current necessary for operating the transmitter location. The transmitter location comprises a circuit generating a constant operating voltage for the transmitter location. Also provided in the transmitter location is a controllable current source being provided, determining the current flowing via the two-wire conductor as a function of the measured variable. The circuit generating the operating voltage for the transmitter location is a switching regulator and in the transmitter location a controllable voltage regulator is provided, the output voltage of which changes in the opposite sense of the signal current and forms the input voltage of the switching regulator.

3 Claims, 3 Drawing Sheets

ASSEMBLY FOR SIGNAL TRANSFER BETWEEN A TRANSMITTER LOCATION AND A RECEIVER LOCATION

BACKGROUND OF THE INVENTION

The invention relates to an assembly for signal transmission between a transmitter location and a receiver location connected to each other by a two-wire conductor via which an analog signal current, variable between two limit values, is transferred, representing a measured variable sensed by a sensor in the transmitter location and forming the supply current necessary for operating the transmitter location, the transmitter location comprising a circuit generating a constant operating voltage for the transmitter location and a controllable current source being provided in the transmitter location, this current source determining the current flowing via the two-wire conductor as a function of the measured variable.

DESCRIPTION OF THE PRIOR ART

An assembly of this kind is known from EP-A-0 744 724. In this known assembly no measures are taken to permit optimizing the power made available in the transmitter location to the sensor and its transducer circuit. Instead, the operating voltage of the transmitter location always needs to be maintained at a constant value so that, depending on the signal current flowing at the time, more or less power is available for the internal supply in the transmitter location.

SUMMARY OF THE INVENTION

The invention is thus based on the object of configuring an assembly of the aforementioned kind so that the power available in the transmitter location is optimized.

This object is achieved in accordance with the invention by an assembly for signal transmission between a transmitter location and a receiver location connected to each other by a two-wire conductor via which an analog signal current, variable between two limit values, is transferred, representing a measured variable sensed by a sensor in said transmitter location and forming the supply current necessary for operating said transmitter location, said transmitter location comprising a circuit generating a constant operating voltage for said transmitter location and a controllable current source being provided in said transmitter location, this current source determining the current flowing via said two-wire conductor as a function of said measured variable, wherein said circuit generating said operating voltage for said transmitter location is a switching regulator and that in said transmitter location a controllable voltage regulator is provided, the output voltage of which changes in the opposite sense of said signal current and forms the input voltage of said switching regulator.

The switching regulator used in the assembly in accordance with the invention has the property of converting the input voltage applied thereto into a constant output voltage, its output power, except for internal losses, being equivalent to the power available at the input end. The available input power can be increased by its input voltage being varied by varying the output voltage of the voltage regulator in the opposite sense to the measured variable. In the presence of a low measured variable which accordingly results in a low signal current, the input voltage of the switching regulator is thus increased whilst it is reduced in the case of a large measured variable resulting accordingly also in a large signal current.

Although using a switching regulator to generate a supply voltage for a transducer circuit and a sensor is known from DE-C-39 34 007 it is, however, not possible in this known assembly to influence the input voltage of the switching regulator to influence the available power.

BRIEF DESCRIPTION OF THE DRAWINGS

Further features and advantages of the invention read from the description of the example embodiments with respect to the drawings in which.

DESCRIPTION OF THE PREFERRED EMBODIMENTS

Figure 1:
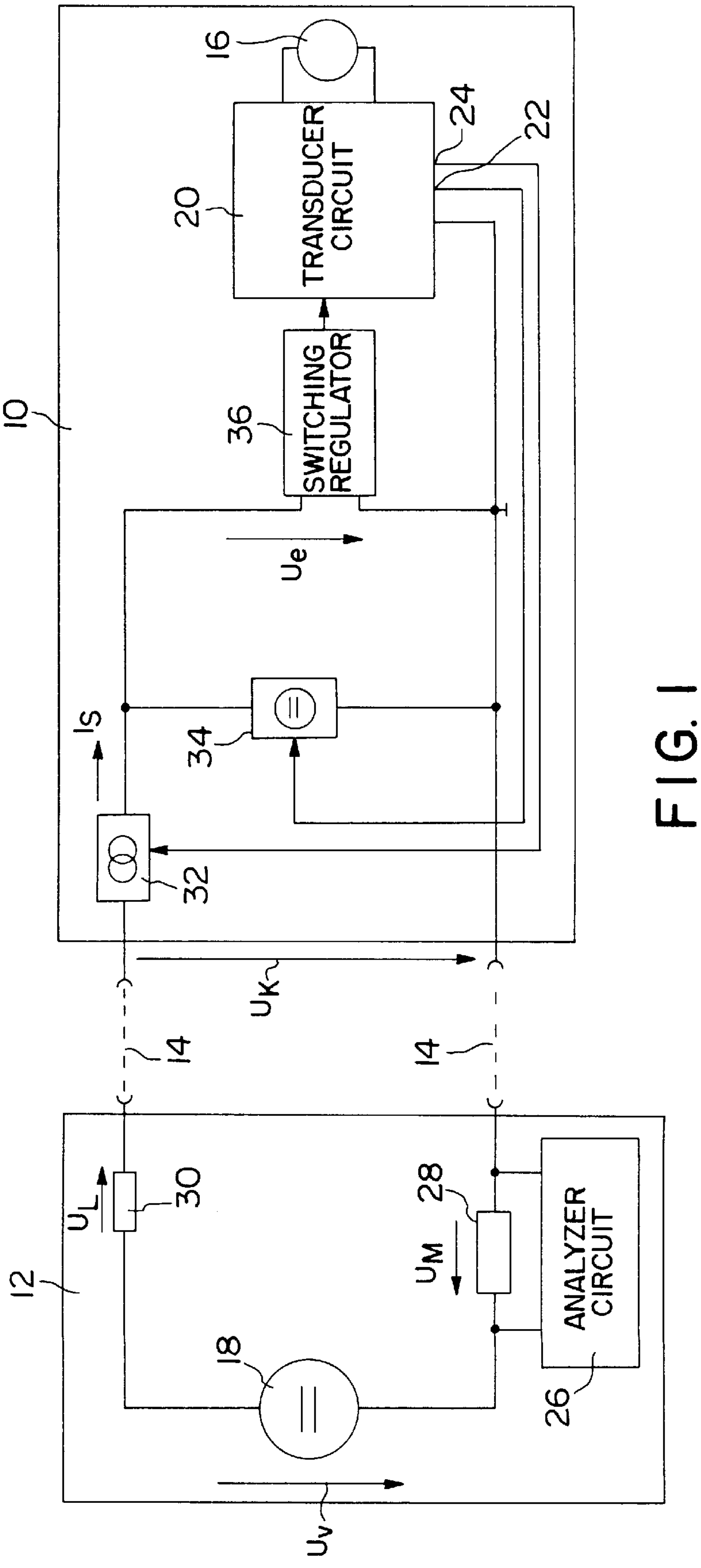
FIG. 1 is a schematic illustration of an assembly for signal transmission between a transmitter location and a receiver location in accordance with a first example embodiment.

Referring now to FIG. 1 in the drawing there is illustrated schematic a transmitter location 10 connected to a receiver location 12 by a two-wire conductor 14. The transmitter location 10 in this example as illustrated is a measurement point in which with the aid of a sensor 16 a measured variable (for example temperature, pressure, moisture content, level, flow) is sensed. The transmitter location 10 contains no energy source of its own, it instead obtaining the supply voltage necessary for its output power from a voltage source 18 contained in the receiver location 12 via a two-wire conductor 14. Via the same two-wire conductor 14 a signal representing the variable being measured is transferred in each case to the receiver location 14. In accordance with a conventional technique this signal is a signal current $I_S$ flowing via the two-wire conductor 14 variable between two predetermined values (usually the current values 4 mA and 20 mA). The voltage source 18 furnishes a DC voltage and the measurement current $I_S$ is a direct current.

For sensing the measured variable the transmitter location 10 contains the aforementioned sensor 16 and a transducer circuit 20 connected thereto, this transducer circuit outputting at the outputs 22 and 24 two signals representing the measured variable in each case. The purpose of these two signals will now be explained.

The receiver location 12 contains an analyzer circuit 26 which obtains the measured variable information from the signal current $I_S$ transferred via the two-wire conductor 14. For this purpose a precision resistor 28 is inserted in the two-wire conductor across which a voltage $U_M$ materializes which is proportional to the signal current $I_S$ transferred via the two-wire conductor and is supplied to the analyzer circuit 26 via the two-wire conductor. In the schematic block diagram shown in FIG. 1 a further resistor is shown in the receiver location 12 which in addition to the resistor 28 represents the load located in the two-wire conductor at the receiving end.

The signal current $I_S$ is adjusted in the transmitter location 10 by a controllable current source 32 to which the signal output by the transducer circuit 20 at the output 24 is applied as the control signal for the signal current $I_S$ to be defined. Depending on each measured variable sensed, the signal current $I_S$ flowing in the two-wire conductor is determined by controlling the current source 32 accordingly.

As further evident from FIG. 1 the transmitter location 10 contains a voltage regulator 34 for maintaining the voltage applied to this element at an adjustable constant value and a switching regulator 36 whose task it is to generate a constant operating voltage for the transducer circuit 20 and the sensor 16. The input voltage for the switching regulator 36 is maintained constant by the voltage regulator 34, the value of the output voltage of this voltage regulator 34 being controllable with the aid of the signal output by the transducer circuit 20 at the output 22. Typically this element 34 is a controllable voltage regulator.

Using the switching regulator 36 in conjunction with the controllable voltage regulator 34 permits always providing the transducer circuit 20 and the sensor 16 with maximum possible power. In this arrangement the switching regulator 36 ensures that despite an increase in its input voltage the operating voltage of the transducer circuit 20 and the sensor 16 is maintained at a constant value so that due to an increase in the input voltage at the switching regulator 36 a higher input power is available, thus also permitting a higher output power. When a measured variable sensed by the sensor 16 is at the lower end of the measured variable range the signal current $I_S$ likewise assumes the lower value of the signal current range, i.e. the value 4 mA in the example as cited above, so that the input power too, at the switching regulator 36 assumes a low value since the input power is formed as the product of signal current and input voltage. Due to the control signal from the transducer circuit 20 the output voltage of the voltage regulator 34 can be increased for this case so that the power available at the input of the switching regulator 36 is likewise increased. This increased power is then available also for operating the transducer circuit 20 and the sensor 16.

When the measured variable sensed by the sensor 16 has a high value, resulting in a high signal current $I_S$, the input voltage produced by the voltage regulator 34 at the input of the switching regulator 36 is reduced by means of the control signal from the transducer circuit 20 since in this case due to the high signal current $I_S$ sufficient power is available for operating the transducer circuit 20 and the sensor 16.

The limits within which the voltage set by the voltage regulator 34 can be varied in response to each sensed measured variable depend on several factors such as the output voltage of the supply voltage source 18, the load formed by the precision resistor 28 and the resistor 30 in the receiver location 12 and the minimum terminal voltage $U_K$ needing to exist at the transmitter location 10 for satisfactory operation thereof.

Figure 2:
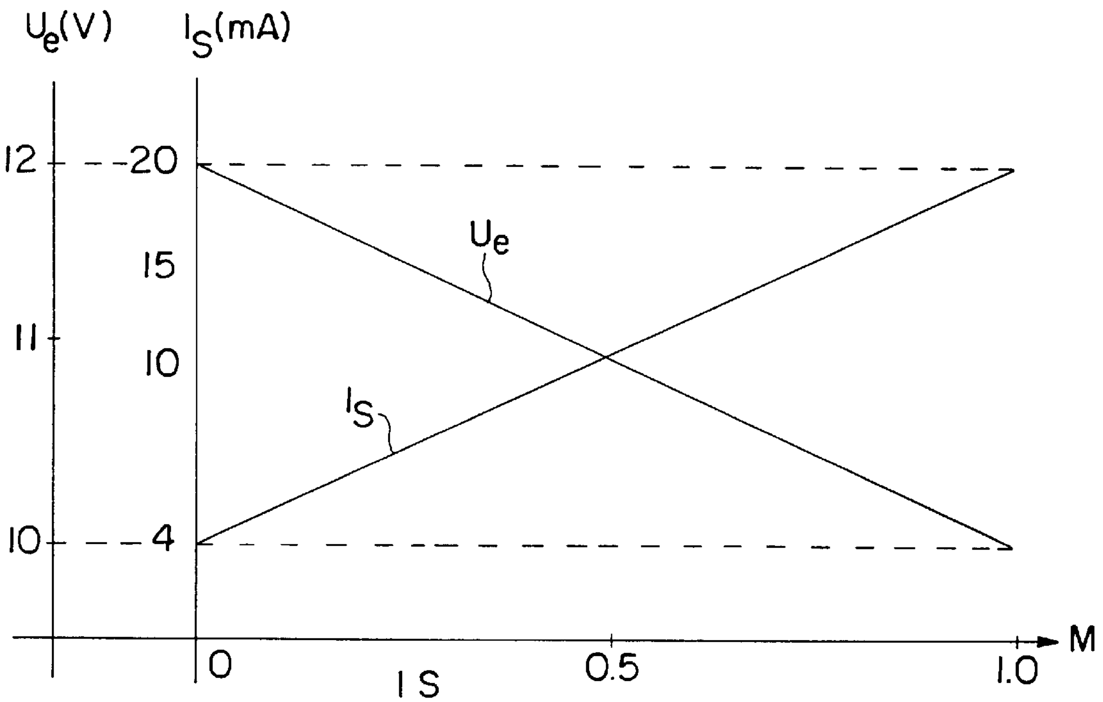
FIG. 2 is a diagram explaining how the measured variable relates to the signal current and input voltage of the switching regulator and FIG. 3 is a schematic illustration of an assembly for signal transmission between a transmitter location and a receiver location in accordance with a second example embodiment.

Referring now to FIG. 2 there is illustrated a diagram indicating how the voltage $U_e$ generated by the voltage regulator 34 and the signal current $I_S$ changes in response to the measured variable M. In this case the measured variable M is illustrated scaled, i.e. its lowest value has the scaled value 0 and its highest value has the scaled value 1. In the case of the two-wire system as explained above the signal current $I_S$ has the value 4 mA for the minimum measured variable and the value 20 mA for the maximum measured variable. In the assumed example the input voltage $U_e$ varies from 12 V for the minimum measured variable to 10 V for the maximum measured variable. It will be appreciated that these values are merely indicated by way of example, they also possibly departing therefrom depending on the particular application.

Figure 3:
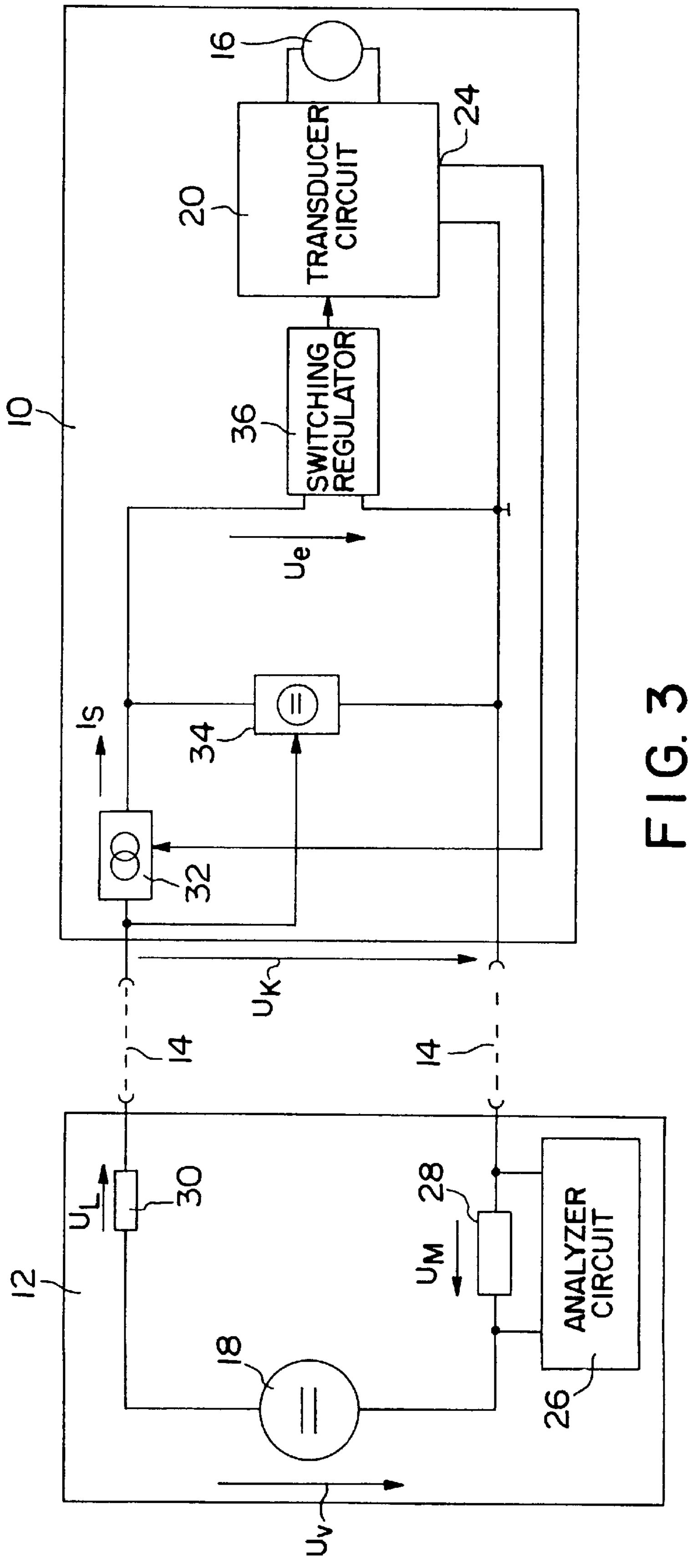

Referring now to FIG. 3 there is illustrated a further embodiment of the assembly as described in the present. Unlike the example embodiment as shown in FIG. 1 the voltage source 34 in this case is not controlled by an output signal of the transducer circuit 20 but directly by the terminal voltage $U_K$ at the transmitter location. This terminal voltage can be used for this purpose since it is likewise explicitly related to the measured variable sensed by the sensor 16 resulting in adjustment of the signal current $I_S$. The signal current $I_S$, also flowing in the receiver location 12, dictates in turn the terminal voltage $U_K$ due to the drop in voltage across the receiver location.

It will be appreciated from the above discussions that optimizing the power made available to the transducer circuit 20 and sensor 16 is made possible with the aid of the assembly as described. It is to be understood that the application of this principle is not restricted to specific transducer circuits and sensors. For example, it may be put to use directly in microwave level sensing devices operating on the basis of the pulsed radar method or frequency modulated continuous wave radar method.

What is claimed is:

1. An assembly for signal transmission between a transmitter location and a receiver location connected to each other by a two-wire conductor via which an analog signal current, variable between two limit values, is transferred, representing a measured variable sensed by a sensor in said transmitter location and forming the supply current necessary for operating said transmitter location, said transmitter location comprising a circuit generating a constant operating voltage for said transmitter location and a controllable current source being provided in said transmitter location, this current source determining the current flowing via said two-wire conductor as a function of said measured variable, wherein said circuit generating said operating voltage for said transmitter location is a switching regulator and that in said transmitter location a controllable voltage regulator is provided, the output voltage of which changes in the opposite sense of said signal current and forms the input voltage of said switching regulator.

2. The assembly as set forth in claim 1, wherein said voltage regulator is controlled by a control signal generated by a transducer circuit processing the signal representing said measured variable output by said sensor.

3. The assembly as set forth in claim 1, wherein said voltage regulator is controlled by a control signal corresponding to the voltage on said two-wire conductor tapped from the input terminals of said transmitter location.

* * * * *

UNITED STATES PATENT AND TRADEMARK OFFICE

CERTIFICATE OF CORRECTION

PATENT NO. : 6,140,940
DATED : October 31, 2000
INVENTOR(S) : Peter Klöfer and Jürgen Krüger It is certified that error appears in the above-identified patent and that said Letters Patent is hereby corrected as shown below:

The Assignee name should be changed from Endress D+ Hauser GmbH + Co. to the following:

Endress + Hauser GmbH + Co.

Signed and Sealed this

First Day of May, 2001

Attest:

NICHOLAS P. GODICI

*Attesting Officer* *Acting Director of the United States Patent and Trademark Office*